(12) United States Patent
Jacques

(10) Patent No.: US 9,219,428 B2
(45) Date of Patent: Dec. 22, 2015

(54) BIPOLAR POWER CONTROL

(76) Inventor: Russell Jacques, Stevenage (GB)

( * ) Notice: Subject to any disclaimer, the term of this patent is extended or adjusted under 35 U.S.C. 154(b) by 1205 days.

(21) Appl. No.: 12/735,594

(22) PCT Filed: Jan. 26, 2009

(86) PCT No.: PCT/GB2009/000212
§ 371 (c)(1),
(2), (4) Date: Sep. 13, 2010

(87) PCT Pub. No.: WO2009/095649
PCT Pub. Date: Aug. 6, 2009

(65) Prior Publication Data
US 2011/0007525 A1    Jan. 13, 2011

(30) Foreign Application Priority Data

Feb. 2, 2008 (GB) .................................. 0801965.5

(51) Int. Cl.
*H05B 41/00*    (2006.01)
*H02M 7/537*    (2006.01)
*H05B 41/282*   (2006.01)

(52) U.S. Cl.
CPC .......... *H02M 7/537* (2013.01); *H05B 41/2827* (2013.01); *H05B 41/2828* (2013.01); *Y02B 20/186* (2013.01); *Y02B 70/1441* (2013.01)

(58) Field of Classification Search
CPC ............ H02M 3/285; H02M 3/33569; H02M 3/33592; H02M 3/337; H02M 3/3376; H02M 3/33523; H02M 7/219; Y02B 70/1475
USPC ....................................................... 363/17–19
See application file for complete search history.

(56) References Cited

U.S. PATENT DOCUMENTS

| | | | | |
|---|---|---|---|---|
| 3,588,669 A | * | 6/1971 | Cutler et al. | 363/132 |
| 4,280,174 A | * | 7/1981 | Sonda | 363/24 |
| 5,019,719 A | * | 5/1991 | King | H03K 5/12 327/108 |
| 5,812,383 A | * | 9/1998 | Majid et al. | 363/21.05 |
| 5,907,479 A | * | 5/1999 | Leu | 363/16 |
| 6,038,142 A | * | 3/2000 | Fraidlin et al. | 363/17 |
| 6,072,710 A | | 6/2000 | Chang | |
| 2001/0030879 A1 | * | 10/2001 | Greenfeld et al. | 363/17 |

FOREIGN PATENT DOCUMENTS

| | | |
|---|---|---|
| DE | 40 35 969 A1 | 8/1991 |
| GB | 2222918 A | 3/1990 |
| JP | 59 132782 A | 7/1984 |
| WO | WO 2007/147725 A | 12/2007 |
| WO | WO 2007147725 A1 | 12/2007 |

* cited by examiner

*Primary Examiner* — Gary L Laxton
*Assistant Examiner* — Henry Lee, III
(74) *Attorney, Agent, or Firm* — Patti & Malvone Law Group, LLC

(57) ABSTRACT

A circuit for controlling a power converter featuring BJTs, through use of a control winding on the transformer that provides the base drive for the BJTs is disclosed. This controller can control the control winding current, thus modifying the commutating of the current or stopping the oscillations. It can provide unidirectional shorts to prevent commutation and can also provide an initial power pulse to control the start or operation of the power converter.

37 Claims, 6 Drawing Sheets

BIPOLAR POWER CONTROL

BACKGROUND OF THE INVENTION

This invention relates to switched mode power supplies, and self-oscillating power converters in particular. The invention is particularly applicable, but by no means limited, for use in fluorescent lighting ballasts.

Bipolar junction transistors (BJTs) can be used as the switches in switched mode power supplies (SMPSs) due to their low cost. The SMPSs using them are normally built to be self-oscillating using inductors and capacitors, needing no external control to cause the switching except when starting the SMPS. In these SMPSs, a transformer having a winding connected in series with the BJT's load current provides the base current of the BJT through a secondary winding. These SMPSs can be used as electronic ballasts in fluorescent lighting.

FIG. 1 is a schematic circuit diagram of the basic components of a self-oscillating electronic ballast 2 based around BJTs. NPN BJTs 4 and 6 are connected in series so as to provide a midpoint 8 between voltage rail 10 and voltage rail 12. A load winding 14 is connected between the midpoint 8 and the load 16. Drive windings 18 and 20 are connected to the base terminals of BJTs 4 and 6 respectively, and are wound on the same core as load winding 14 such that the three windings around the core act as a transformer. The small dots indicate the alignment of the windings with respect to each other on the core in the usual manner. The BJTs are connected in parallel with freewheeling diodes 22 and 24, which allow load current to flow during the period in which the BJTs have switched but the current has not yet commutated. Alternatively, the freewheeling diodes may be connected to the bases of BJTs 4 and 6. The load 16 may include reactive, capacitive and/or resistive components. The circuit is generally completed by connections (not shown) from the load 16 to the low voltage rail 12 and/or the high voltage rail 10. A common variation on this circuit includes the use of a resistor in series with each BJT so as to assist in turning the BJTs 4 and 6 off in high current conditions. Other circuits include resistors connected in series with the bases of the BJTs 4 and 6 to help control the frequency of oscillation.

Generally, the circuit is initiated by supplying a large current to the base of BJT 6 so as to rapidly turn it fully on. Means for doing this commonly use a DIAC and are not discussed here. When BJT 6 is triggered, the voltage at midpoint 8 rapidly reaches that of the low voltage rail 12, causing current to flow through the load 16. As this occurs, current flows through load winding 14 away from the dot, causing current in drive winding 20 to flow towards the dot—providing more current to the base of BJT 6 and keeping it on. At the same time, current in drive winding 18 flows towards the dot, hence drawing current away from the base of BJT 4 and holding it off.

As the load current through load winding 14 increases, the magnetisation current also increases, leading to a current in drive winding 20 that does not increase as rapidly as the load. This means that the base current in BJT 6 is also not increasing as rapidly as the load. Eventually the ratio of load current to base current will exceed the gain of the BJT 6, this causes BJT 6 to start to turn off. As BJT 6 turns off, current through it is restricted and so current through load winding 14 starts to pass through freewheeling diode 22. The load current starts to decrease and eventually the load current commutates, causing current in winding 14 to reverse. The current in drive winding 20 now flows away from the base of BJT 6 and current in drive winding 18 flows towards the base of BJT 4, causing it to start conducting and allowing current to flow from the load to the high voltage rail 10. Eventually BJT 4 shuts down as BJT 6 did, and the current passing through the load commutates again and BJT 6 starts conducting again.

This self-oscillation occurs at a frequency that depends on the properties of the components, such as inductors, resistors and transistors in the circuit. However, it is difficult and expensive to accurately control the tolerances of these devices. This results in an unpredictable self-oscillating frequency that differs from circuit to circuit and may be too high or low for the required task.

One common change that has been made to electronic ballasts in recent years has been the move to the use of field effect transistors (FETs) rather than BJTs. FETs offer greater control than BJTs due to the fact that a voltage, rather than a current, activates them. This has led to their growing adoption in the integrated ballasts of compact fluorescent lamps (CFLs), as this ease of control allows the production of CFLs with improved start characteristics and longevity. However, FETs are significantly more expensive than BJTs, and this use of FETs increases the costs associated with the manufacture of CFLs.

It is an object of this invention to provide a device and method for better controlling the BJTs used in self-oscillating power converters.

BRIEF SUMMARY OF THE INVENTION

According to a first aspect of the invention there is provided a controller for controlling a power converter, the power converter having a bipolar junction transistor (BJT) as a switch, the base of which is connected to a drive winding, said drive winding being magnetically coupled to a load winding which carries the power converter load current, the controller having a current control element comprising; first and second control winding connections for connection to a control winding magnetically coupled to the load and drive windings; first and second bidirectional electronic switches arranged in series with each other between the first and second control winding connections; and a first diode connected in parallel with the first switch.

Preferably, the electric paths formed between each of the first and second switches and the respective control winding connections include no diodes. The first and second switches allow the controller to create a bidirectional short-circuit across the control winding. As the control winding is magnetically coupled to the drive windings, this creates an effective short-circuit in the drive winding, hence allowing current to flow away from the base of the BJT if it were on. Diodes have an intrinsic voltage drop associated with them. If there were a diode in the electric path that forms the bidirectional short-circuit, then the minimum voltage across the control winding would be at least the diode voltage drop. Consequently, the effective short-circuit created in the drive winding would not act like a short-circuit if the voltage across it was less than the voltage drop across the diode (assuming a turns ratio of 1:1 between the control and drive windings). Even if the voltage was greater than the diode voltage, it would reduce the effectiveness of the turn off. As such, the presence of a diode in the path of the bidirectional short-circuit across the control winding might necessitate a higher control winding:drive winding turns ratio in order to create an effective short, capable of shorting low voltages. This increase in the turns ratio, however, results in a larger leakage inductance associated with the windings, and hence the short takes longer to introduce and is less effective. Therefore, the lack of diodes confers a highly effective short-circuit without the need for excessive windings.

The controller may have a control unit for controlling the first and second switches.

Preferably, the control unit is adapted to control the first and second switches such that it can close both the first and second switch to provide a bidirectional short-circuit between the first and second control winding connections, and hence across the control winding.

Preferably, the control unit is adapted to control the first and second switches to selectively open the first switch and close the second switch. This allows the controller to provide a unidirectional short-circuit between the first and second control winding connections (via the first diode) and hence across the control winding. This short-circuit creates an effective unidirectional short-circuit in the drive winding in a similar manner to the bidirectional short-circuit described above, thus only allowing current to flow either towards or away from the base of the BJT. In the case that the power converter has two BJTs in a half-bridge arrangement, the polarity of each of their respective drive windings opposes the other. In such an arrangement, the unidirectional short-circuit created would not allow current to flow away from the base of one of the BJTs, whilst preventing it from flowing toward the base of the other.

Optionally, the control unit can open both the first and second switches so as to electrically disconnect the first and second control winding connections, thus removing any controlling input from the controller on the power converter. This ability makes the controller ideal for use with a self-oscillating power converter (SOPC). An SOPC is a power converter that uses the current passing through the load winding to trigger the BJTs that act as its switches through drive windings connected to their bases. An SOPC may have, for example, two or four BJTs arranged in a half- or full-bridge arrangement between two power rails and around the load. Each BJT has its own drive winding connected to its base with every winding being magnetically coupled with the load winding, which is typically in series with the load. Once an SOPC has been started, for example, by triggering one of the BJTs with a DIAC, the current flowing through the load winding produces enough current in the drive windings to turn on one of the BJTs. During this phase, the current passing through the load winding creates current in the drive winding of the BJT that the load current is passing through, thus latching it on. As the load current increases, the proportion which acts as the magnetisation current in the load winding increases, resulting in a base current to the conducting BJT that does not increase as fast as the collector-emitter current. Eventually, the gain demanded of the BJT is greater than it can supply (this may happen before or after saturation of the transformer formed by the windings) and it begins to switch off. Load current may pass through a freewheeling diode. This eventually leads to the base drive current reducing further until the BJT turns off. The load current eventually commutates, after which the current flowing through the load winding changes direction. This causes current to flow in the opposite direction in the drive windings, switching on the other BJT in the pair. As current increases through the load winding, the BJT is latched on and the previously active BJT is fully off. This results in a duty cycle of substantially 50:50 in the pair of BJTs assuming they are equivalent components.

The controller's ability to electrically disconnect the control winding allows it to "step back" once the SOPC's oscillations have started, and leave the oscillations to continue uncontrolled i.e. the SOPC is allowed to self-oscillate. Of course, it may resume control at any time, or may continue controlling the oscillator after it is started to prevent uncontrolled behaviour.

Advantageously, the current control element of the controller may further comprise a third switch arranged between a first power supply connection and the first control winding connection. This allows current to pass through the control winding, hence producing a corresponding current in the drive windings. By so doing, the controller can potentially start the power converter in the case that it is of the SOPC type by driving current in the drive windings toward the base of one or more of the BJTs. In any case, this ability allows the controller to push one of the BJT switches on, which can be useful in driving the power converter if the current flowing through the load is insufficient to cause self-oscillation. At the same time as one BJT is driven on by this method, the other in the pair will be driven off by virtue of the different polarities of their windings. This can be useful to force rapid commutation of current in the power converter.

Preferably, the control unit is adapted to control the third switch to provide an optional connection between the first power supply connection and the first control winding connection.

Advantageously, the current control element of the controller further comprises a fourth switch arranged between said first power supply connection and said second control winding connection. This allows the controller to optionally pass current through the control winding in the other direction when compared to the current that flows when the third switch is closed. With the fourth switch, the controller can start the power converter "in the other direction" than compared to using the third switch to start the power converter, by causing the opposite BJT in the pair to turn on first.

Preferably, the control unit is adapted to control the fourth switch to selectively provide a connection between the first power supply connection and the second control winding connection.

Typically, the control unit is arranged to selectively close the third or fourth switches to control the direction of the current flow in the control winding. This allows the controller to completely control the oscillations in an SOPC, by deliberately driving the BJTs on and off. This also provides the ability to start the current flowing through the load, when starting the power converter, in either direction.

The controller may include a second power supply connection between the first switch and the second switch. Thus the current flowing from the first power supply connection passes through the control winding to the second power supply connection, or vice versa. This arrangement requires that one of the first and second switches be closed when closing the third or fourth switch to provide current, but prevents current flowing from one power supply connection to the other without passing through the control winding. The four switches can also be used to dissipate any excess power that might be applied to the power supply connections, such as an over voltage, by passing it through the control winding and hence on to the BJTs. This arrangement means that so long as the first and second switches are open, the third and fourth switches can be closed to provide a bidirectional short-circuit across the control winding, so long as the switches are bidirectional.

Optionally, the controller may further comprise a second diode connected in parallel with the second switch. This diode would need to be arranged cathode-to-cathode or anode-to-anode with the first diode to avoid creating a constant unidirectional short-circuit across the control winding. The control unit may optionally close the first switch and open the second switch, hence providing a unidirectional short-circuit across the control winding, through the second diode and in the other direction to the previously mentioned unidirectional short-circuit. This is advantageous as it allows the controller to exert strong control over a SOPC by constantly preventing current flowing to the base of one of the BJTs, hence holding it off and thus permitting it to reduce the frequency of the oscillations.

According to a second aspect of the invention there is provided controller for controlling a power converter, the power converter having a bipolar junction transistor (BJT) as a switch, the base of which is connected to a drive winding, said drive winding being magnetically coupled to a load winding which carries the power converter load current, the controller having a current control element comprising; first and second control winding connections for connection to a control winding magnetically coupled to the load and drive windings; and a first switch in the form of a Field Effect Transistor (FET) arranged between the first and second control winding connections for providing a bidirectional short-circuit between them that does not include a diode.

Such an arrangement allows the controller to provide a simple and very effective bidirectional short across the control winding as described previously. In a SOPC, this short circuit allows charge to drain away from the bases of the BJTs and switch them off, hence causing the current to commutate. The short-circuit can then be removed by opening the first switch, thus allowing the commutated load current to switch on one of the BJTs. Alternatively, the short may be maintained so as to cease the oscillations in the SOPC.

Preferably, the current control element further comprises a second switch arranged between a first power supply connection and the first control winding connection. This has the previously described advantages of allowing the controller to drive the oscillations of a SOPC or to initiate them.

According to a third aspect of the invention there is provided a controller for controlling a power converter, the power converter having a bipolar junction transistor (BJT) as a switch, the base of which is connected to a drive winding, said drive winding being magnetically coupled to a load winding which carries the power converter load current, the controller having a current control element comprising; first and second control winding connections for connection to a control winding magnetically coupled to the load and drive windings; a first bidirectional electronic switch arranged between the first and second control winding connections for providing a bidirectional short-circuit between them; and a second switch arranged between a first power supply connection and the first control winding connection.

Preferably, electric paths are formed between the first switch and each of the first and second control winding connections where the paths include no diode. This results in a very effective bidirectional short-circuit on closing the first switch with the benefits previously described.

The controller of the second or third aspects of the invention may further comprise a control unit for controlling the first and second switches.

Preferably, the control unit is adapted to control the first switch to selectively close so as to provide a bidirectional short-circuit between the first and second control winding connections and so across the control winding connected between them.

Preferably, the control unit is adapted to control the second switch to selectively provide a connection between the first power supply connection and the first control winding connection, hence allowing the controller to initiate oscillations in an attached SOPC and to drive one of the BJTs therein.

Advantageously, the current control element further comprises a third switch coupled between said first power supply connection and said second control winding connection. This allows the controller to drive another of the BJTs within the power converter.

Preferably, the control unit is adapted to control the third switch to selectively provide a connection between the first power supply connection and the second control winding connection.

Beneficially, the current control element may further comprise a fourth bidirectional electronic switch arranged in series with the first switch between the first and second control winding connections, and a first diode connected in parallel with the first switch. This enables the controller to create a unidirectional short-circuit between the first and second control winding connections via the first diode in the manner previously described, whilst maintaining the ability to create a bidirectional short by closing both the fourth and first switches.

Preferably, the control unit is arranged to control said first and fourth switches to selectively open the first switch and close the fourth switch, so as to provide a unidirectional short-circuit between the first and second control winding connections via the first diode. Such a short circuit has the previously mentioned advantage of being able to prevent current flowing away from the base of a first BJT in a SOPC whilst preventing current flowing to the base of a second BJT in the SOPC.

Beneficially, the current control element may further comprise a second diode connected in parallel with the fourth switch. This diode must be arranged so that it opposes the first diode (connected anode to anode or cathode to cathode) to avoid creating a constant unidirectional short-circuit. The controller can create a unidirectional short-circuit via this second diode in the other direction compared to the short circuit created via the first diode. Therefore, the controller can reverse the above described situation and prevent current flowing to the base of the first BJT in a SOPC and from the base of the second BJT in a SOPC.

Preferably, the control unit is arranged to control the first and fourth switches to selectively close the first switch and open the fourth switch, so as to provide a unidirectional short-circuit between the first and second control winding connections via the second diode.

The controller may have a second power supply connection coupled between the first and second switch so as to complete the circuit through the current control element with the first power supply connection. This has the (already discussed) benefits of preventing a short circuit that avoids the control winding whilst an appropriate configuration of switches is selected and allowing the current control element to act as a shunt regulator.

The control unit of any of the above aspects of the present invention may have one or more voltage sensing connections electrically coupled to one of said switches in the current control element. This allows the control unit to measure the current flowing through the switch, which can be related to the current flowing through the load of the power converter via the transformer formed by the windings. Using this information, the controller can react to conditions within the power converter to maintain optimal conditions. For example, if an attached SOPC is oscillating too slowly, the controller can force commutation of the current more frequently. The controller can achieve this by providing a bidirectional short-circuit across the control winding so as to switch the BJTs in the SOPC off. Alternatively, the controller may create a unidirectional short-circuit across the control winding to prevent current flowing to the base of the currently active BJT (and to allow it to flow away freely), thus switching it off. In a similar manner, if the SOPC is oscillating too quickly a unidirectional short-circuit can be used to prevent an inactive BJT turning on whilst blocking current flow away from the active BJT, thus prolonging the oscillations. The controller can also detect if oscillations have stopped or if the load current is insufficient for self-oscillation, and provide driving current through the control winding to correct this. Finally, the controller can also detect an overload condition and create and maintain a bidirectional short-circuit across the control winding, switching all the BJTs off and stopping oscillations.

Preferably, the control unit controls the switches based on the voltage on one or more of the voltage sensing connections.

According to a fourth aspect of the invention there is provided a method for controlling a power converter, the power converter having a BJT as a switch, the base of the BJT is connected to a drive winding, said drive winding being magnetically coupled to a load winding which carries the power converter load current, whereby control over the power converter is achieved by controlling a control winding magnetically coupled to said drive winding, the method comprising selectively providing a bidirectional short-circuit across the control winding that does not include a diode.

According to a fifth aspect of the invention there is provided a method for controlling a power converter, the power converter having a BJT as a switch, the base of the BJT is connected to a drive winding, said drive winding being magnetically coupled to a load winding which carries the power converter load current, whereby control over the power converter is achieved by controlling a control winding magnetically coupled to said drive winding, the method comprising selectively providing one of a bidirectional short-circuit across the control winding; a unidirectional short-circuit across the control winding; and no electrical path across the control winding.

Preferably, the method of the fourth and fifth aspects may further comprise selectively controlling the current in the control winding by providing additional current to the control winding to modify the current in the drive winding.

Preferably, the bidirectional switches are field effect transistors. The entire controller may be embodied in an integrated circuit.

BRIEF DESCRIPTION OF THE SEVERAL VIEWS OF THE DRAWINGS

The invention will now be described, by way of example, with reference to the drawings in which.

DETAILED DESCRIPTION OF THE INVENTION

Figure 2:
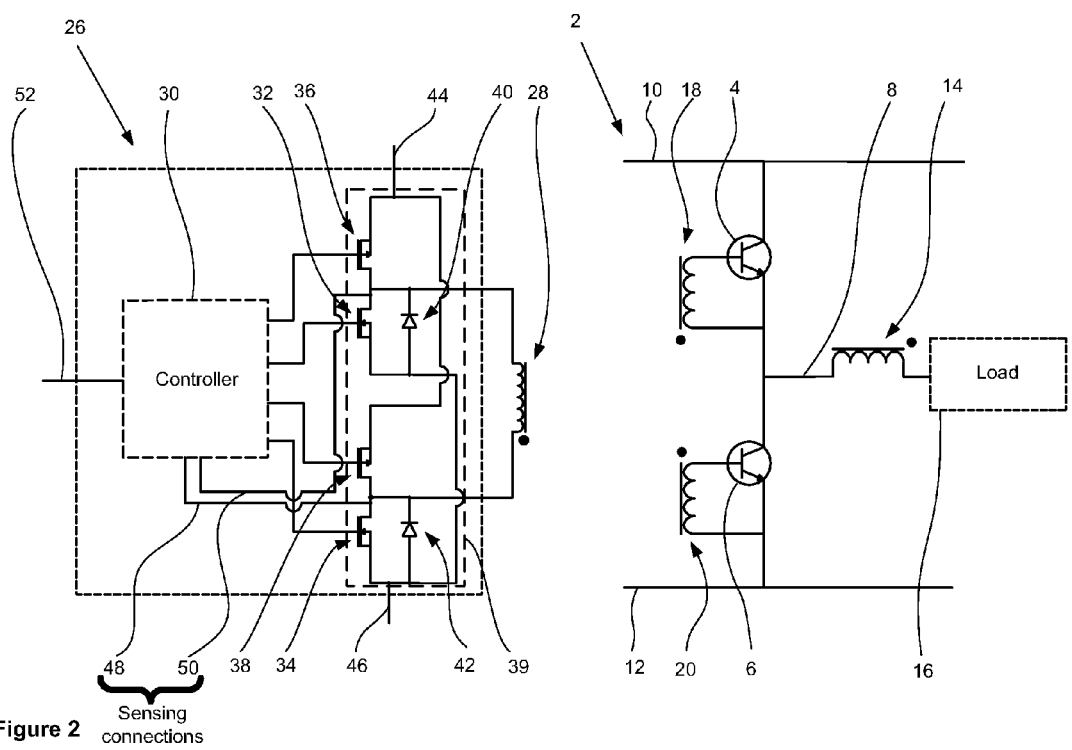
FIG. 2 is a schematic circuit diagram of a controller according to the invention with a self-oscillating electronic ballast.

FIG. 2 shows a controller 26 according to a first embodiment of the present invention. Controller 26 is connected to control winding 28, which is wound around the same core as the transformer consisting of load winding 14 and drive windings 18 and 20. The ratio of turns in the windings would typically be 15:2:5:5 respectively. This control winding 28 allows the controller to influence the current in drive windings 18 and 20, and hence the switching of BJTs 4 and 6.

The controller 26 has a control unit 30, for providing switching control signals to control MOSFETs 32, 34, 36 and 38. Control unit 30 has connections to the gate electrodes of MOSFETs 32, 34, 36 and 38. MOSFETs 32 & 34 and 36 & 38 are N- and P-MOSFETs respectively. They are referred to below as switches as this is the role that they play, and it is possible that any equivalent electronic switch could replace them, although MOSFETs are preferred, particularly in Integrated Circuit (IC) environments. These switches form a current control element 39 and allow controller 26 to manipulate the current flowing in control winding 28. This in turn allows the control unit 30 to manipulate the oscillation of the self-oscillating electronic ballast 2.

Figure 1:
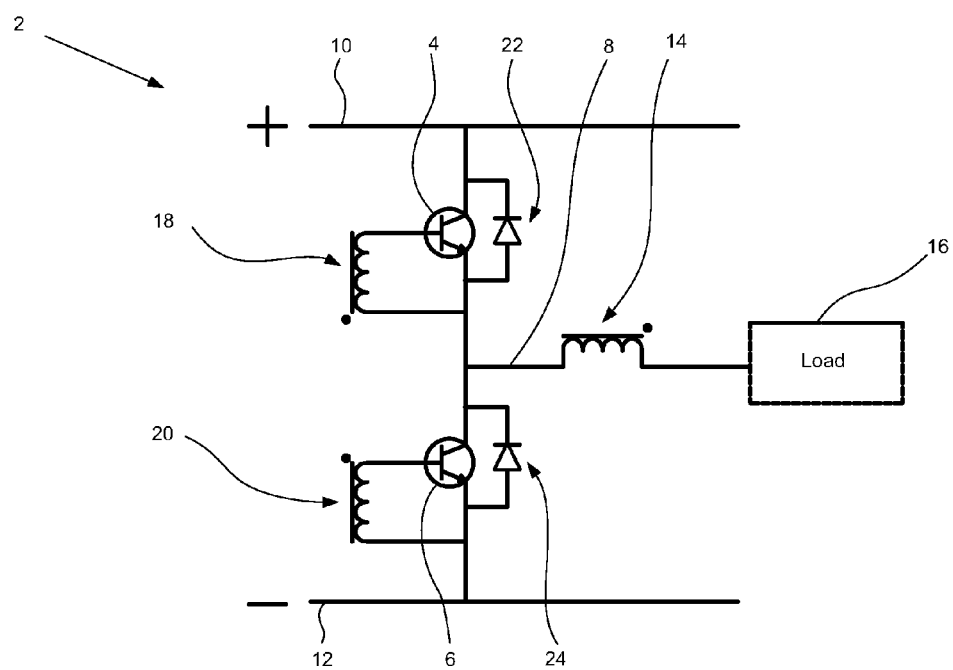
FIG. 1 is a schematic circuit diagram of a self-oscillating electronic ballast.

For example, by closing switches 32 and 34, controller 26 creates a short-circuit across the ends of control winding 28, allowing current to flow in either direction. This effectively shorts windings 14, 18 and 20, creating a low impedance path between base and emitter of both BJTs 4 and 6 with the consequence of turning them both off. This short also causes the base collector junction of BJTs 4 and 6 to act as freewheeling diodes, obviating the need for the separate diodes 22 and 24 of FIG. 1, although these diodes may be retained anyway. Initially, this causes the current flowing in the load to commutate, but if the short is maintained for several times the resonant period then the oscillations will cease. MOSFETs have a low voltage drop associated with them in the on state. The presence of only two MOSFETs in this short-circuit, coupled with the absence of diodes and any other transistors, means that there is no pn junction voltage drop and so even a small voltage between the base and emitter of either BJT 4 or 6 will be effectively shorted by switches 32 and 34.

Diodes 40 and 42 enable controller 26 to control the direction of current flowing through control winding 28. For example, closing only switch 34 creates a unidirectional short-circuit across control winding 28 through diode 40. This prevents the flow of current away from the base of BJT 4 and towards the base of BJT 6, thus preventing BJT 6 turning on whilst allowing BJT 4 to turn on. Closing switch 34 also creates an effective emitter-base short in BJT 4, allowing the base-collector junction of BJT 4 to act as a freewheeling diode, similar to diode 22 in FIG. 1.

This technique allows the controller 26 to reduce the oscillations of the electronic ballast, which can be advantageous, for example if the oscillations are increasing uncontrollably. Closing only switch 32 creates a similar unidirectional short-circuit in the other direction through diode 42.

When switch 34 is closed, if the turns ratio of control winding 28 to drive winding 18 is high enough, such as 3:1 in this embodiment, the base-emitter voltage of BJT 4, as expressed on winding 28, will be substantially greater than the effective voltage drop across diode 40. This means that the forward voltage drop across the diode will not prevent BJT 4 from remaining on. The same principle applies when switch 32 is closed, and current flows through diode 42.

The current control element 39, comprising switches 32, 34, 36 and 38 and diodes 40 and 42, is connected between power supply nodes 44 and 46. In a typical IC application these would supply an EMF of for example 3.3V, with node 44 being designated as +3.3V and node 46 as 0V. The EMF provided across nodes 44 and 46 means that the controller 26 can create current in control winding 28, thus controlling current in the drive windings 18 and 20 and powering the bases of BJTs 4 and 6. The controller 26 can thus be used to begin the oscillations of self-oscillating electronic ballast 2, negating the need for the additional circuit elements such as DIACs present in other electronic ballasts. In the case that switches 36 and 34 are closed, the current flowing in control winding 28 causes current to flow in the drive windings 18 and 20 from the base of BJT 6 and towards the base of BJT 4; turning BJT 4 on and holding BJT 6 off. In the reverse case that switches 32 and 38 are closed, current flows in the opposite direction and BJT 6 is turned on and BJT 4 is turned off. In both cases, if the BJT being turned on is already on, the effect of causing current to flow results in increasing the base drive current on that BJT and reducing its saturation voltage. This driving ability also allows the controller to keep the ballast 2 oscillating, even when the load current is too low to maintain oscillations, by driving BJTs 4 and 6 constantly. This can be useful in variable power demand applications, such as for dimmable CFLs. Whilst it is useful to be able to drive the BJTs during each cycle, it may not be necessary to provide a driving pulse during every cycle. It may be sufficient to simply drive the BJTs once every n cycles. Similarly, it is not essential to drive both BJTs.

In summary, switches 32 and 34 can be used to provide bi- or uni-directional shorting of the control winding 28 and, in combination with switches 36 and 38, provide driving current to the bases of the BJTs. It will be obvious to one skilled in the art that switches 36 and 38 may also be used to provide a bidirectional short and with switches 32 and 34 to provide a driving current. When all switches 32, 34, 36 and 38 are open, control winding 28 is isolated and the self-oscillating ballast 2 is left to oscillate at its natural frequency. This may be particularly useful when used with, for example, a CFL, this will provide the ability to control the ballast 2 during pre-heat and ignition before leaving it to run at its natural oscillation frequency. The controller 26 can take control of the oscillations again at any time, for example on detecting an overload.

Control unit 30 can, using the different techniques illustrated above, initiate oscillations in self-oscillating electronic ballast 2, control the frequency of the oscillations and even stop them. After the oscillations have started, the operating frequency may be controlled using only switches 32 and 34 if the load current is high enough. The control unit 30 can curtail an oscillation cycle to increase the frequency as well as extend a cycle or delay the start of the next to reduce the frequency.

Control unit 30 may use entirely open loop control, determining the frequency of the oscillations using something as simple as a Voltage-Controlled Oscillator. Alternatively, it can use feedback by receiving inputs directly from external sensors, monitoring the ballast 2 or by monitoring the control winding 28 to infer the conditions in the ballast.

FIG. 2 shows sensing connections 48 and 50 that provide information on the current and voltages on the control winding connection nodes, to control unit 30. These can be used to sense what is going on in self-oscillating power converter 2 via control winding 28. These connections 48 and 50 can be used to detect the voltages across the switches 32, 34, 36 and 38, which is related to the current in the winding 28. These voltages can either be measured across the drain-source resistance of the relevant MOSFET, or across a resistor (not shown) connected in series with the MOSFET, e.g. between the MOSFET 34 and power supply node 46.

This sensing ability of control unit 30 can allow it to detect when the current in control winding 28 commutates, which occurs approximately at the same time as the current in the ballast 2 commutates. This information can be used by the control unit 30 to detect when to release the conditions it was imposing in order to commute the current e.g. to remove the short. For example, when both switches 32 and 34 are closed for an extended period of time, the sensing connections 48 and 50 enable control unit 30 to detect when the current is low due to the oscillations in the ballast 2 having stopped.

The period and frequency of the oscillations can be determined by sensing when the voltage across the control winding or one of switches 32 and 34 (the voltage across an open switch when the other is closed) passes through zero, indicating a commutation of the current in the ballast. This allows control unit 30 to detect oscillations at a higher frequency than that demanded by the controller 26, which may occur when a resonating inductor saturates or the fluorescent lamp controlled by the ballast fails to strike. The ability of control unit 30 to sense the voltage across control winding 28 allows it to calculate how much current is passing through the load. This can be used by control unit 30 for a number of different purposes, such as detecting an overload; limiting the supplied current to a maximum value or ensuring that the current is above a minimum value. Calculating the load current is simplified by the inclusion of two resistors in self-oscillating ballast 2, connected in series with the emitters of BJTs 4 & 6 and within the base drive loops formed by the drive windings 18 and 20 respectively.

Control unit 30 also has an external input 52 (although this is not an essential component). This may be used to provide additional sensing information or control inputs. Any of the inputs 48, 50 and 52 may also be used to program the controller 26. For example control unit 30 may sense a resistance or voltage on any of the pins, such as the control winding connection, which may be used, for example, to set the controller 26 into a test mode, or set the preheat time in a fluorescent lamp controller.

Figure 3:
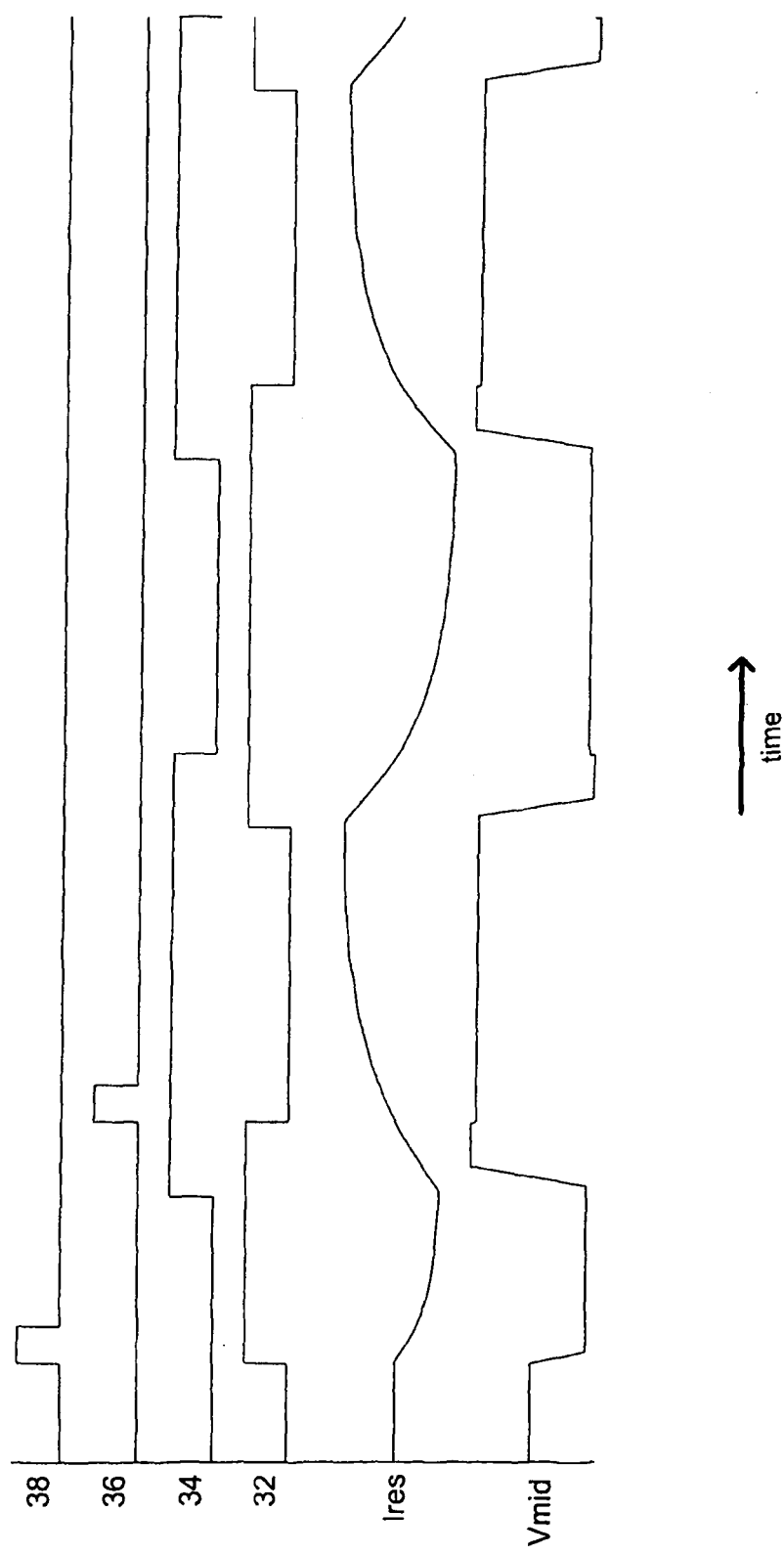
FIG. 3 is a graph representing waveforms in a first control strategy.

The controller 26 of the present embodiment is capable of a number of different control strategies. FIG. 3 shows a "maximal" control strategy, where the self-oscillating ballast can be very tightly controlled. FIG. 3 illustrates the control signals of switches 32, 34, 36 and 38 in addition to the current passing through load winding 14 (shown as Ires) and the midpoint voltage between BJTs 4 and 6 (shown as Vmid). All of the control signals shown are "on" when high. As switches 36 and 38 are PMOS devices the signals could therefore be considered to be inverted compared to the actual drive signals.

The graph begins with the converter in the off state, and it is assumed that Vmid is approximately half of the positive supply of the power converter, or the voltage across BJT 6 is large. Switches 32 and 38 are then closed by control unit 30 for a time determined by the controller, which may be as short as around 500 ns or as long as switch 34 is open. All the time that switches 32 and 38 are closed, the control winding 28 is supplied with current by the current control element 39 and induces a current in the drive windings 18 and 20. Specifically, as previously stated, it causes current in drive winding 20 to flow towards the base of BJT 6 (turning BJT 6 on) and creates potential across drive winding 18 biasing the base of BJT 4 to prevent current flowing through it. No current flows in drive winding 18 as BJT 4 starts in the off state. This causes current to start flowing through BJT 6 and load winding 14. The flow of current in winding 14 induces a current in winding 20, latching BJT 6 on.

Switch 38 may then be opened, leaving switch 32 to provide a unidirectional short-circuit of control winding 28 through diode 42. This unidirectional short-circuit prevents BJT 4 from switching on, even if the load current commutates. After a period of time determined by control unit 30, switch 34 is closed providing a bidirectional short-circuit across control winding 28. This causes BJT 6 to turn off whilst keeping BJT 4 off, and the load current to flow through the freewheeling diode formed by the base-collector junction of BJT 4 or a separate diode (not shown). Vmid then rises to close to the voltage of supply rail 10 and the current eventually commutates. Switch 32 opens around this time leaving a unidirectional short in control winding 28 that will keep BJT 6 off. As the current is now flowing in the other direction in load winding 14, current induced in drive winding 18 flows towards the base of BJT 4, turning it on.

FIG. 3 shows switch 36 receiving a closing pulse at this time as well. This may also be as short as 500 ns or as long as switch 32 is open. With switches 36 and 34 closed, current flows through control winding 28 causing current in drive winding 18 to flow towards the base of BJT 4 and current in drive winding 20 to flow away from the base of BJT 6. If the oscillations have already started at this point, closing switch 36 has little effect. However; if the oscillations have not started for any reason, such as the initial assumptions about Vmid were incorrect and it was low, then this pulse will act in a similar way to closing switch 38, to put drive current into the base of BJT4. In this situation, the second starting pulse switching BJT 4 on begins the oscillations.

Switch 36 is then opened again, leaving switch 34 to provide a unidirectional short-circuit across control winding 28 through diode 40 hence keeping BJT 6 off. After another period of time determined by control unit 30, switch 32 is closed thus again providing a bidirectional short-circuit. This causes BJT 4 to switch off whilst keeping BJT 6 off, causing the current to commutate once more. This cycle is repeated, either with or without the closing of switches 36 and 38. Switches 36 and 38 need not be used again once oscillations have started, although their use may be necessary to maintain oscillations in a low load power situation.

If, for example, the input voltage to self-oscillating electronic ballast 2 is too low to drive the load properly control unit 30 may hold switches 32 and 34 closed so as to hold the ballast 2 in an off state. This mode of operation may also be useful if there is an overload condition such as a short-circuit or if the power is suddenly removed to prevent flicker.

If the self-oscillating ballast 2 ceases oscillating, for example if the load of a fluorescent lamp fails to strike or, with an unregulated AC supply to a resistive load, such as in a Halogen lighting transformer where the power to the converter falls close to zero every 8 (60 Hz AC) or 10 (50 Hz AC) ms, it may be necessary to re-start the oscillations. The control unit 30 can detect the lack of oscillations and restart them by means of applying further starting pulses using switches 36 and 38.

Switches 36 and 38 can also be used to regulate the voltage on the supply to controller 26. By turning on switch 36 whilst switches 32 and 38 are off and switch 34 is on, excess power supplied to the controller 26 will be diverted into the base of BJT 4. Likewise by turning on switch 38 whilst switches 34 and 36 are off and switch 32 is on, excess power supplied to the controller 26 will be diverted into the base of BJT 6, improving the performance of the converter 2. In doing so, current control element 39 acts as a shunt regulator. In an integrated circuit (IC) implementation this avoids the need for a separate voltage regulator, similar to a Zener device, and avoids the heat associated with such a device as the power is dissipated outside the IC. This saves on the cost of manufacturing the IC as it helps reduce the number of components. Dissipating the power outside of the IC helps to reduce the thermal output of the chip. In order for current control element 39 to have this action it is not necessary for switch 32 to be off when switch 36 is on, or for switch 34 to be off while switch 38 is on. In particular, if diverting the excess power into the base of the BJT's is insufficient to reduce the input voltage, switches 36 and 38 may be switched slightly on when switches 32 and 34 are on to further reduce the voltage. It may be preferable to have two switches 36 (not shown) and two switches 38 (not shown), using one set of switches 36 and 38 for supply regulation and one set for supplying current to control winding 28.

It is possible to sense how close the frequency of the self-oscillating ballast 2 is to its natural resonant frequency by measuring the time for which switches 32 and 34 are both on. With respect to FIG. 3, this is the overlap of the control signals for switches 32 and 34 and is indicative of the time that it takes the current in self-oscillating ballast 2 to commute. As the frequency of the self-oscillating ballast 2 approaches its natural resonant frequency this overlap time reduces. Control unit 30 can use this information for a number of purposes, such as ensuring that the demanded frequency does not fall below the natural resonant frequency, a situation that can occur if the load is a fluorescent lamp and it fails to ignite. This information allows control unit 30 to find the resonant frequency regardless of the conditions it is under and the possible variances between one self-oscillating electronic ballast and the next due to tolerances in the components. It can therefore regulate the frequency of oscillations during pre-heat such that they are close to the resonant frequency, and it can sense and set a minimum allowable frequency of oscillations for use in e.g. a power supply.

Figure 4:
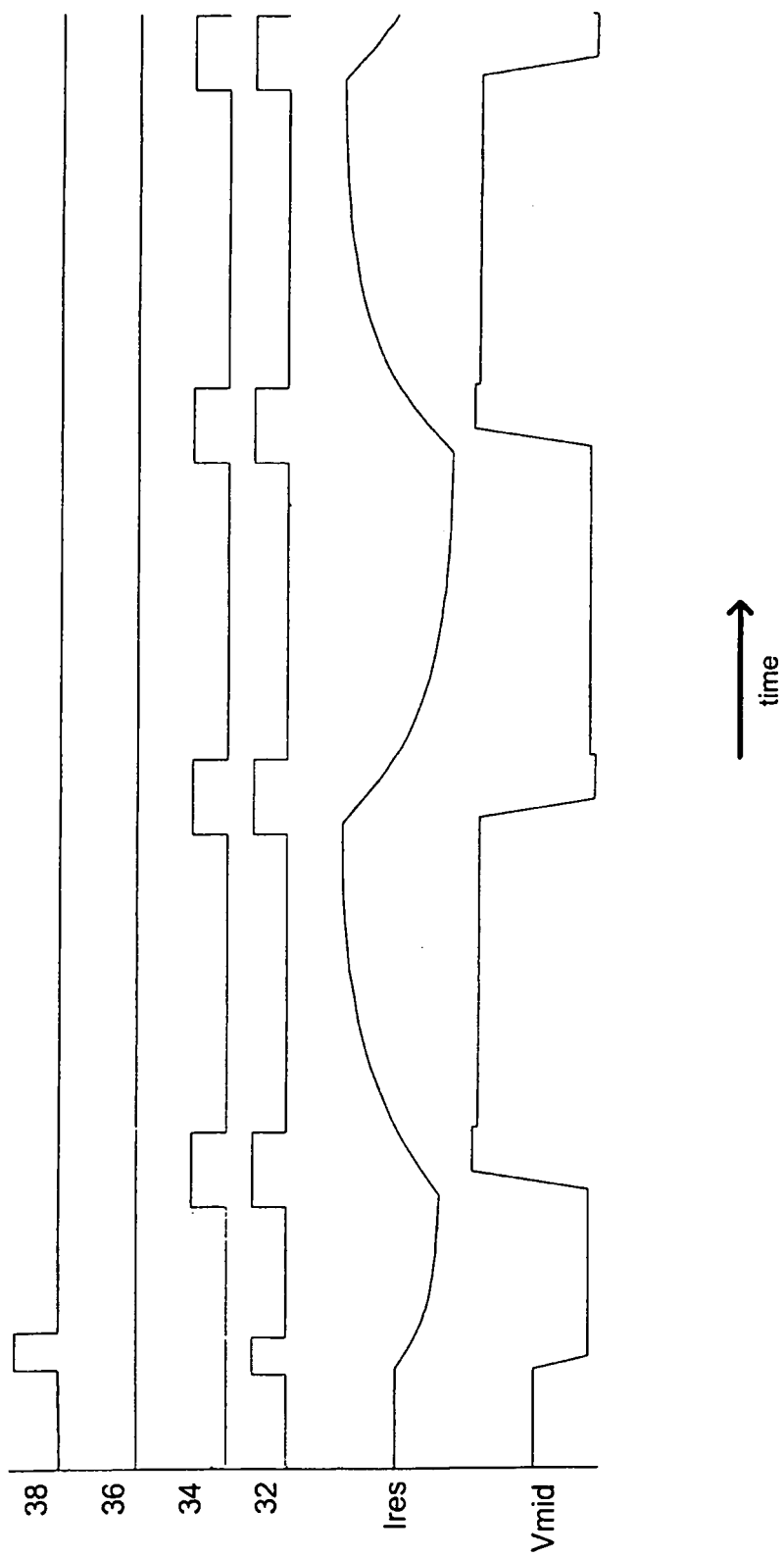
FIG. 4 is a graph representing waveforms in an alternative control strategy.

The control strategy described above and illustrated in FIG. 3 shows the most practical on-time of both switches 32 and 34. There are also less effective control strategies that will work to control the oscillations that have on-times of switches 32 and 34 that are significantly reduced. FIG. 4 shows a control strategy that features significantly shorter on times for all switches. Switches 32 and 38 close for a brief period determined by control unit 30 to start the ballast 2 oscillating. The current flowing through the load winding 14 increases, causing current in drive winding 20 to increase, latching BJT 6 on. Switches 32 and 38 are then opened. After a time determined by control unit 30, switches 32 and 34 are closed to provide a bidirectional short across control winding 28 and turn off BJT 6. Switches 32 and 34 are both opened again when the load current commutates and passes through zero; enabling BJT 4 to turn on. Again, after a time determined by control unit 30 switches 32 and 34 are closed again to commutate the current, and the cycle continues.

Figure 5:
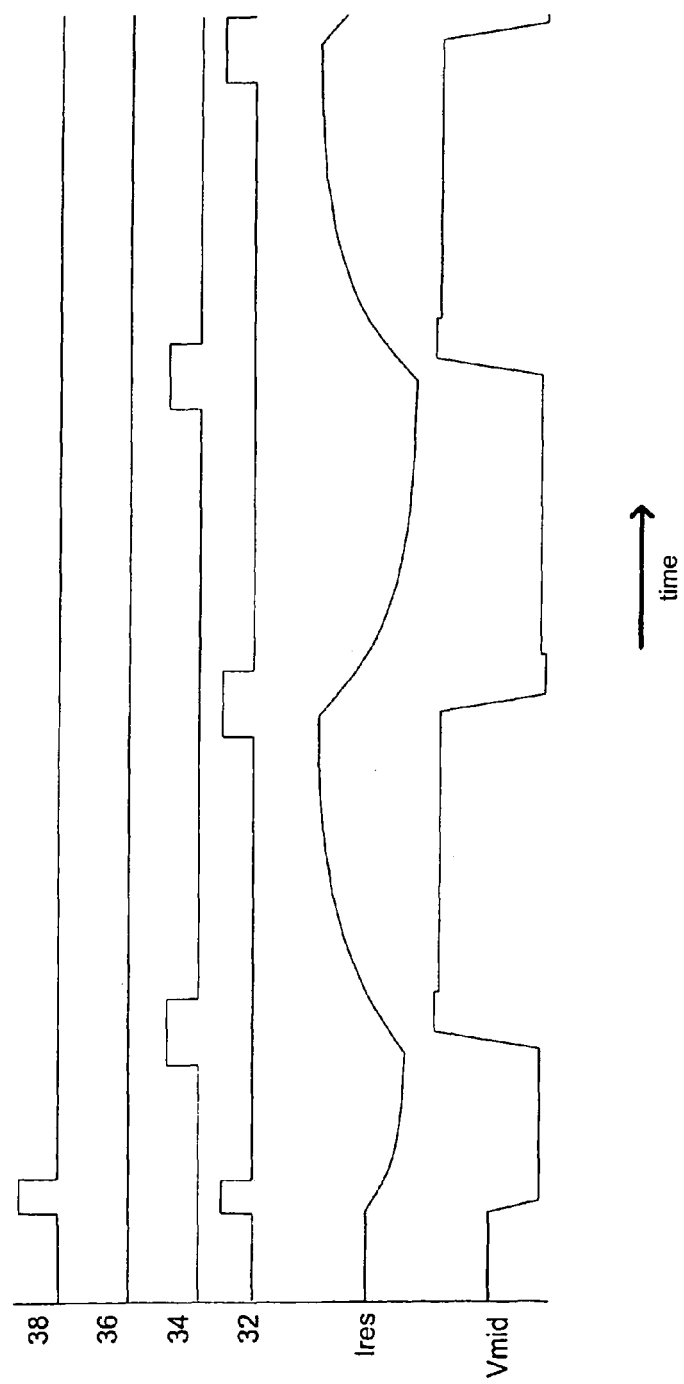
FIG. 5 is a graph representing waveforms in a further control strategy.

FIG. 5 shows a third potential control strategy having the minimum on time of switches 32 and 34. Switches 38 and 32 turn on BJT 6 and start oscillations in the normal manner. After a time determined by the control unit 30, switch 34 closes to stop the drive current of BJT 6, opening again when the current has commutated (passed through zero). BJT 4 turns on, and after a time determined by the control unit 30, switch 32 closes to stop the drive current of BJT 4. After the current commutates, BJT 6 turns on again and the cycle continues. There are a number of control strategies featuring switching times of switches 32 and 34 between those illustrated in FIGS. 3, 4 and 5 that would also work.

Figure 6B:
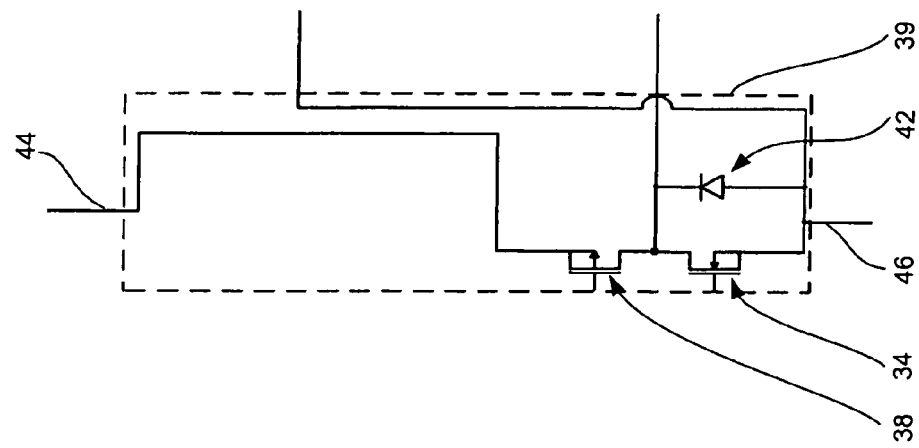
FIGS. 6a and 6b are schematic circuit diagrams of alternative current control elements.
Figure 6A:
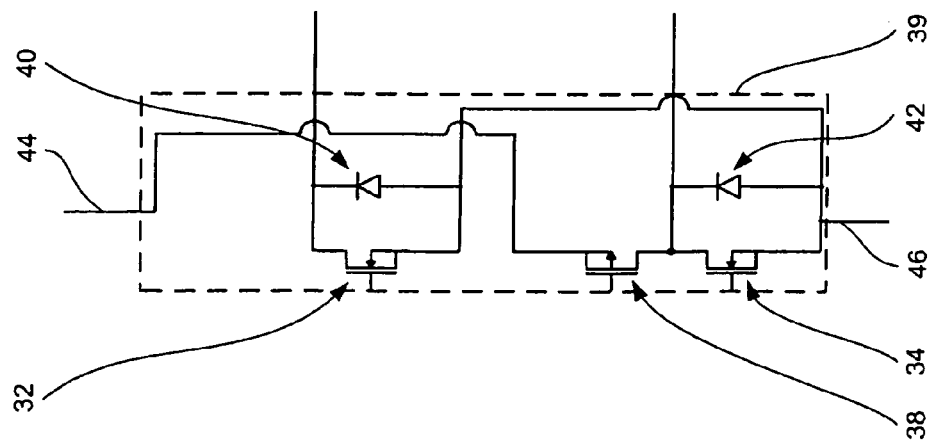

Some implementations of the invention may not require the facility to provide a driving pulse to both BJTs 4 and 6. FIG. 6a shows an alternative current control element 39 in which switch 36 has been removed—it could easily be one of the other switches. All of the previously mentioned control strategies will work with this embodiment, except it will only be possible to start oscillations by turning only either BJT 4 or BJT 6 on. FIG. 6b illustrates a third embodiment in which only one side of control winding 28 is controlled, with the removal of switch 32. This allows a similar control strategy to that illustrated in FIG. 4. A reduced ratio of turns between the control winding 28 and the drive windings 18 and 20 may be used to avoid the possibility of triggering the ESD protection circuits built into a potential IC.

The embodiment described above provides a controller and method of control for an electronic ballast for fluorescent lamps. However, the principles described may readily be adapted for use in controlling other self-oscillating power converters based around BJTs, such as: dimmable and fixed ballasts for compact and linear fluorescent lamps; cold cathode fluorescent ballasts; halogen lighting transformers and many other DC-DC or DC-AC power converters that require some kind of control. The principles described can be used to control full-bridge, half bridge configurations and resonant topologies; and may be adapted for use in phase shifted resonant converters—in which there would be two controllers with locked frequencies and a phase shift between them.

The invention claimed is:

1. A controller for controlling a power converter, the power converter having first and second bipolar junction transistors (BJTs) as switches, a first drive winding connected between a base and an emitter of the first BJT and a second drive winding connected between a base and an emitter of said second BJT, said first and second drive windings being magnetically coupled to a load winding which carries the power converter load current, the controller having a current control element comprising:

first and second control winding connections for connection to a control winding magnetically coupled to the load and drive windings;

first and second switches, said first and second switches being bidirectional electronic switches arranged in series with each other between the first and second control winding connections to provide a bidirectional short-circuit between said first and second control winding connections when said first and second switches are closed; and a first diode connected in parallel with the first switch to provide a unidirectional short-circuit between said first and second control winding connections when only said second switch is closed.

2. The controller according to claim 1, wherein electric paths are formed between each of the first and second switches and a respective one of the control winding connections and the paths include no diode.

3. The controller according to claim 1, further comprising a control unit for controlling the first and second switches.

4. The controller according to claim 3, wherein the control unit is operable to control the first and second switches to selectively close both the first and second switch to provide a bidirectional short-circuit between the first and second control winding connections.

5. The controller according to claim 3, wherein the control unit is operable to control the first and second switches to selectively open the first switch and close the second switch to provide a unidirectional short-circuit between the first and second control winding connections via the first diode.

6. The controller according to claim 3, wherein the control unit is operable to control the first and second switches to selectively open both the first and second switches to electrically disconnect the first and second control winding connections.

7. The controller according to claim 3, wherein the current control element further comprises a third switch coupled between a first power supply connection and the first control winding connection.

8. The controller according to claim 7, wherein said control unit is operable to control said third switch to selectively provide a connection between the first power supply connection and the first control winding connection.

9. The controller according to claim 7, wherein said current control element further comprises a fourth switch coupled between said first power supply connection and said second control winding connection.

10. The controller according to claim 9, wherein said control unit is operable to control the fourth switch to selectively provide a connection between the first power supply connection and the second control winding connection.

11. The controller according to claim 10, wherein the control unit is arranged to selectively close the third or fourth switches to control the direction of the current flow in the control winding.

12. The controller according to claim 7, wherein a second power supply connection is coupled between the first switch and the second switch.

13. The controller according to claim 3, further comprising a second diode connected in parallel with the second switch and oriented in opposition to the first diode to prevent current flowing through both the first and second diodes simultaneously, and wherein the control unit is arranged to selectively close the first switch and open the second switch to provide a unidirectional short-circuit between the control winding connections via the second diode.

14. The controller according to claim 1, further comprising a second diode connected in parallel with the second switch and oriented in opposition to the first diode to prevent current flowing through both the first and second diodes simultaneously.

15. A controller for controlling a power converter, the power converter having first and second bipolar junction transistors (BJTs) as switches, a first drive winding connected between a base and an emitter of the first BJT and a second drive winding connected between a base and an emitter of said second BJT, said first and second drive windings being magnetically coupled to a load winding which carries the power converter load current, the controller having a current control element comprising:

first and second control winding connections for connection to a control winding magnetically coupled to the load and drive windings; and a first switch in the form of a Field Effect Transistor (FET) arranged between the first and second control winding connections to provide a bidirectional short-circuit between the first and second control winding connections that does not include a diode and thereby effectively providing a short circuit between the base and the emitter of the respective first and second BJTs to control oscillation of the converter.

16. The controller according to claim 15, wherein the current control element further comprises a second switch arranged between a first power supply connection and the first control winding connection.

17. A controller for controlling a power converter, the power converter having first and second bipolar junction transistors (BJTs) as switches, a first drive winding connected between a base and an emitter of the first BJT and a second drive winding connected between a base and an emitter of said second BJT, said first and second drive windings being magnetically coupled to a load winding which carries the power converter load current, the controller having a current control element comprising:

first and second control winding connections for connection to a control winding magnetically coupled to the load and drive windings;

a first switch, said first switch being a bidirectional electronic switch arranged between the first and second control winding connections to provide a bidirectional short-circuit between the first and second control winding connections when said first switch is closed; and a second switch arranged between a first power supply connection and the first control winding connection to provide power to said control winding.

18. The controller according to claim 17, wherein electric paths are formed between the first switch and each of the first and second control winding connections and the paths include no diode.

19. The controller according to claim 17, further comprising a control unit to control the first and second switches.

20. The controller according to claim 19, wherein the control unit is operable to control the first switch to selectively close to provide a bidirectional short-circuit between the first and second control winding connections.

21. The controller according to claim 19, wherein the control unit is operable to control the second switch to selectively provide a connection between the first power supply connection and the first control winding connection.

22. The controller according to claim 19, wherein the current control element further comprises a third switch coupled between said first power supply connection and said second control winding connection.

23. The controller according to claim 22, wherein the control unit is operable to control the third switch to selectively provide a connection between the first power supply connection and the second control winding connection.

24. The controller according to claim 22, wherein the current control element further comprises:
a fourth switch, said fourth switch being a bidirectional electronic switch coupled between said first switch and said second control winding connection; and
a first diode connected in parallel with the first switch.

25. The controller according to claim 24, wherein said control unit is arranged to control said first and fourth switches to selectively open the first switch and close the fourth switch, to provide a unidirectional short-circuit between the first and second control winding connections via the first diode.

26. The controller according to claim 24, further comprising a second diode connected in parallel with the fourth switch and oriented in opposition to the first diode to prevent current flowing through both the first and second diode simultaneously.

27. The controller according to claim 26, wherein the control unit is arranged to control the first and fourth switches to selectively close the first switch and open the fourth switch, to provide a unidirectional short-circuit between the first and second control winding connections via the second diode.

28. The controller according to claim 24, further comprising a second power supply connection coupled between the first and second switch.

29. The controller according to claim 19, wherein the control unit has one or more voltage sensing connections electrically coupled to one of said switches in the current control element for measuring the current flowing through them.

30. The controller according to claim 29, wherein the control unit controls the switches based on the voltage on one or more of the voltage sensing connections.

31. A method for controlling a power converter, the power converter having first and second bipolar junction transistors (BJTs) as switches, a first drive winding connected between a base and an emitter of the first BJT and a second drive winding connected between a base and an emitter of said second BJT, said first and second drive windings being magnetically coupled to a load winding which carries the power converter load current, wherein control over the power converter is achieved by controlling a control winding magnetically coupled to said drive winding, the method comprising the step of selectively providing a bidirectional short-circuit across the control winding that does not include a diode and thereby effectively providing a short circuit between the base and the emitter of the respective first and second BJTs to control oscillation of the converter.

32. A method for controlling a power converter, the power converter having first and second bipolar junction transistors (BJTs) as switches, a first drive winding connected between a base and an emitter of the first BJT and a second drive winding connected between a base and an emitter of said second BJT, said first and second drive windings being magnetically coupled to a load winding which carries the power converter load current, wherein control over the power converter is achieved by controlling a control winding magnetically coupled to said drive winding, the method comprising the step of selectively providing one of:
a bidirectional short-circuit across the control winding and thereby effectively providing a short circuit between the base and the emitter of the respective first and second BJTs to control oscillation of the converter;
a unidirectional short-circuit across the control winding and thereby effectively providing a short circuit between the base and the emitter of one of the first and second BJTs to control oscillation of the converter; and
no electrical path across the control winding.

33. The method of claim 31, further comprising the step of selectively controlling the current in the control winding by providing additional current to the control winding to modify the current in the drive winding.

34. The controller according to claim 1, wherein said first and second bidirectional electronic switches are Field Effect Transistors.

35. The controller according to claim 3, wherein the control unit has one or more voltage sensing connections electrically coupled to one of said switches in the current control element to measure the current flowing through them.

36. The controller according to claim 35, wherein the control unit controls the switches based on the voltage on one or more of the voltage sensing connections.

37. The method of claim 31, further comprising the step of selectively controlling the current in the control winding by providing additional current to the control winding to modify the current in the drive winding.

* * * * *